(12) United States Patent
Cochran et al.

(10) Patent No.: US 8,813,482 B2
(45) Date of Patent: Aug. 26, 2014

(54) ALARM SYSTEM FOR TOWABLE HYDRAULIC MACHINES

(75) Inventors: Gary L. Cochran, Colwich, KS (US); Mark D. Bird, Clearwater, KS (US)

(73) Assignee: Coneqtec Corp., Wichita, KS (US)

( * ) Notice: Subject to any disclaimer, the term of this patent is extended or adjusted under 35 U.S.C. 154(b) by 799 days.

(21) Appl. No.: 13/021,268

(22) Filed: Feb. 4, 2011

(65) Prior Publication Data

US 2011/0192154 A1   Aug. 11, 2011

Related U.S. Application Data

(60) Provisional application No. 61/301,829, filed on Feb. 5, 2010.

(51) Int. Cl.
| | | |
|---|---|---|
| *F16D 31/00* | (2006.01) | |
| *F16D 33/00* | (2006.01) | |
| *F16D 37/00* | (2006.01) | |
| *F16D 39/00* | (2006.01) | |
| *F16D 31/02* | (2006.01) | |

(52) U.S. Cl.
USPC ................................. 60/328; 60/399; 60/403

(58) Field of Classification Search
USPC .............................. 60/399, 403, 406; 180/442
See application file for complete search history.

(56) References Cited

U.S. PATENT DOCUMENTS

| 3,961,310 | A | * | 6/1976 | Grant | 180/287 |
|---|---|---|---|---|---|
| 4,191,270 | A | * | 3/1980 | Monteith | 180/53.4 |
| 4,640,094 | A | * | 2/1987 | Wittren | 60/385 |
| 4,942,935 | A | * | 7/1990 | Lech | 180/406 |
| 6,338,247 | B1 | * | 1/2002 | Drin | 60/466 |
| 6,892,534 | B2 | * | 5/2005 | Silva et al. | 60/404 |
| 7,180,720 | B2 | * | 2/2007 | Ichimura | 361/178 |
| 2005/0194198 | A1 | * | 9/2005 | Lin Chang | 180/279 |
| 2008/0238187 | A1 | * | 10/2008 | Garnett et al. | 303/112 |
| 2009/0133951 | A1 | * | 5/2009 | Schultz et al. | 180/307 |
| 2009/0308066 | A1 | * | 12/2009 | Satake | 60/433 |

OTHER PUBLICATIONS

Komatsu, "PC 1250 Hydraulic Excavator", Oct. 2009, Komatsua, Pertinent pp. 1-3, 5, and 9.*
Komatsu, PC 1250 Hydraulic Excavator Brochure (2009), accessible at http://www.komatsu.com/ce/products/pdfs/PC1250_1250SP-8_.pdf.*

* cited by examiner

*Primary Examiner* — Edward Look
*Assistant Examiner* — Daniel Collins
(74) *Attorney, Agent, or Firm* — Woodard, Emhardt, Moriarty, McNett & Henry LLP

(57) ABSTRACT

One embodiment of the system comprises a towable machine having at least one hydraulic motor arranged on the machine and operable to drive at least one wheel arranged on the machine. At least one hydraulic propelling pump is arranged to supply hydraulic fluid flow via a hydraulic circuit to the hydraulic motor to selectively drive the wheel. The system has a non-operative configuration wherein hydraulic fluid flow is blocked between the hydraulic motor and the hydraulic pump. A pressure sensor is associated with the hydraulic circuit to detect an improper pressure load when the circuit is in a non-operative configuration, and operates to trigger an alarm element.

19 Claims, 5 Drawing Sheets

ALARM SYSTEM FOR TOWABLE HYDRAULIC MACHINES

This application claims the benefit of U.S. Provisional Patent Application No. 61/301,829, filed Feb. 5, 2010, which is hereby incorporated by reference in its entirety.

FIELD OF THE INVENTION

Aspects of the present disclosure relate to towable self-propelled hydraulic machines. The illustrated system is described in the context of a sweeping machine, but it can be useful in any application that involves a hydraulically driven towable machine.

BACKGROUND OF THE INVENTION

Various mobile hydraulically powered machines are known. Often such machines are self contained, engine powered, and hydraulically driven though a hydraulic pump and motor combination. As one example, a self-propelled sweeper 100 (FIG. 3) can be used to remove dust, dirt and debris from roads and streets around construction areas. In certain arrangements, one or more wheels of the machine are each driven by a corresponding hydraulic motor. Certain of such machines are towable to allow for transporting the machine from job site to job site without the need for loading and unloading the machine on a trailer. Such machines often come with individual mechanical disconnects allowing each wheel to rotate independently from its drive motor, for example to allow higher towing speeds.

A limitation of mechanical disconnect systems is that the drive system can be damaged if the machine is towed without the wheel being properly disengaged from the drive motor. If the machine is towed with one or more of the wheels engaged, the wheel rotation will move hydraulic fluid through the motor and will try to force the fluid through the hydraulic system, which can damage the hydraulic system. This condition can also create severe loading on the mechanical drive parts and tires of the machine.

Further, if one or more wheels is engaged while another wheel or wheels are disengaged, the wheel(s) and motor(s) that are still engaged can become a hydraulic pump forcing hydraulic fluid flow, via a hydraulic circuit, through the disengaged motor(s) and wheel(s). In certain situations, if left to rotate freely and with an ever-increasing flow of oil, both motors can exceed their design limits and fail, contaminating the entire hydraulic system.

Aspects of the present disclosure provide an alarm system to minimize these and other problems.

SUMMARY

One embodiment of the system comprises a towable machine having at least one hydraulic motor arranged on the machine and operable to drive at least one wheel arranged on the machine. At least one hydraulic propelling pump is arranged to supply hydraulic fluid flow via a hydraulic circuit to the hydraulic motor during operation of the machine to selectively drive the wheel. The system has a non-operative configuration wherein hydraulic fluid flow is blocked between the hydraulic motor and the propelling pump. A pressure sensor is associated with the hydraulic circuit in communication with hydraulic flow through the hydraulic motor to detect an improper pressure load in the hydraulic circuit when the circuit is in a non-operative configuration. The sensor operates to trigger an alarm element.

In certain embodiments, the system includes a steering or secondary pump which operates valves to change the hydraulic circuit to an open configuration to allow hydraulic fluid flow from the propelling pump to the hydraulic motor. The steering pump and valves may automatically change the hydraulic circuit to an open configuration when the steering pump is in operation, and the circuit may automatically return to a non-operative configuration when operation of the steering pump ends.

In certain embodiments, a system comprises an hydraulic motor operable to drive a wheel. An hydraulic circuit is arranged to supply hydraulic fluid flow to the hydraulic motor to selectively drive the wheel. The hydraulic circuit has a non-operative configuration wherein hydraulic fluid is restricted from flowing within the circuit. A pressure sensor is associated with the hydraulic circuit adjacent the hydraulic motor to detect an improper hydraulic fluid pressure load in the hydraulic circuit when the circuit is in the non-operative configuration. An alarm element is triggered by the pressure sensor when an improper hydraulic fluid pressure load is detected.

In alternate embodiments, a system comprises an hydraulic motor operable to drive a wheel. At least one hydraulic source is arranged to supply hydraulic fluid flow via an hydraulic circuit to the hydraulic motor to drive the wheel during operation of the machine. The hydraulic circuit has a non-operative configuration wherein hydraulic fluid is restricted from flowing within the hydraulic circuit. A sensor is associated with the hydraulic circuit in communication with flow through the hydraulic motor to detect an improper hydraulic fluid pressure load in the hydraulic circuit when the circuit is in the non-operative configuration. An alarm element is triggered by the sensor when an improper hydraulic fluid pressure load is detected.

This summary is provided to introduce a selection of the concepts that are described in further detail in the detailed description and drawings contained herein. This summary is not intended to identify any primary or essential features of the claimed subject matter, nor is it intended to be used as an aid in determining the scope of the appended claims. Each embodiment described herein is not intended to address every object described herein, and each embodiment does not include each feature described. Other forms, embodiments, objects, advantages, benefits, features, and aspects of the present invention will become apparent to one of skill in the art from the detailed description and drawings contained herein.

DESCRIPTION OF PREFERRED EMBODIMENTS

For the purposes of promoting an understanding of the principles of the invention, reference will now be made to the embodiments illustrated and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

Figure 1:
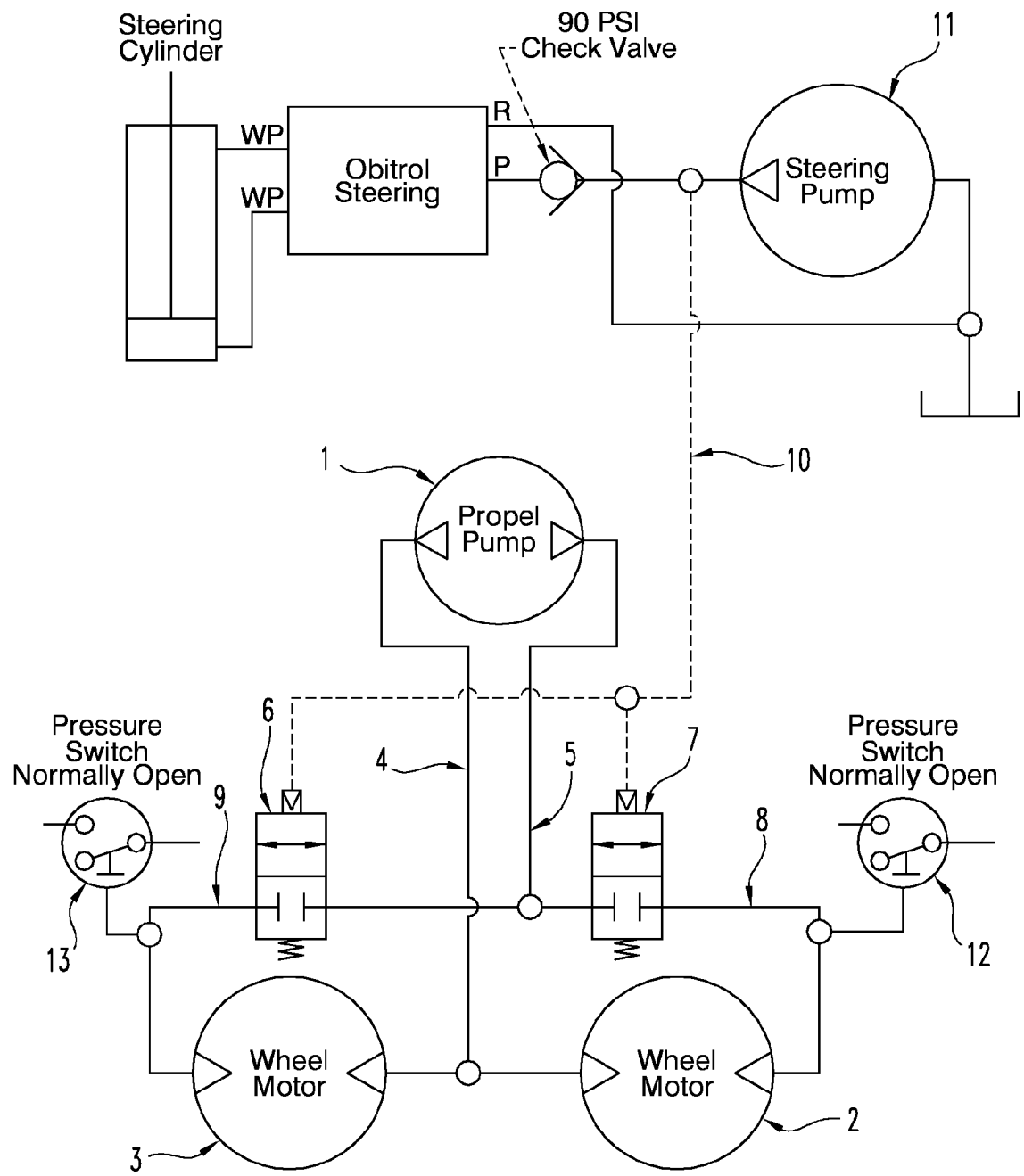
FIG. 1 is a schematic view of a hydraulic circuit according to a preferred embodiment of the present disclosure.
Figure 2:
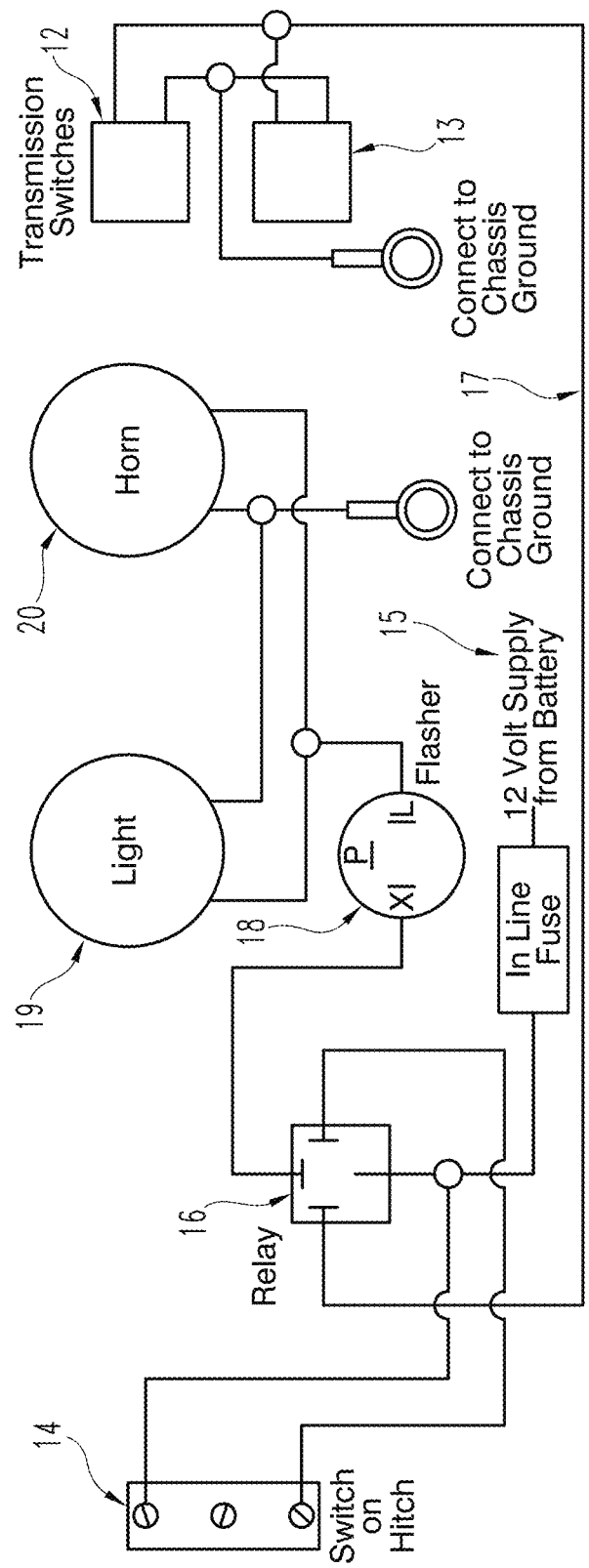
FIG. 2 is schematic view of an electrical circuit interacting with the hydraulic circuit of FIG. 1.
Figure 3:
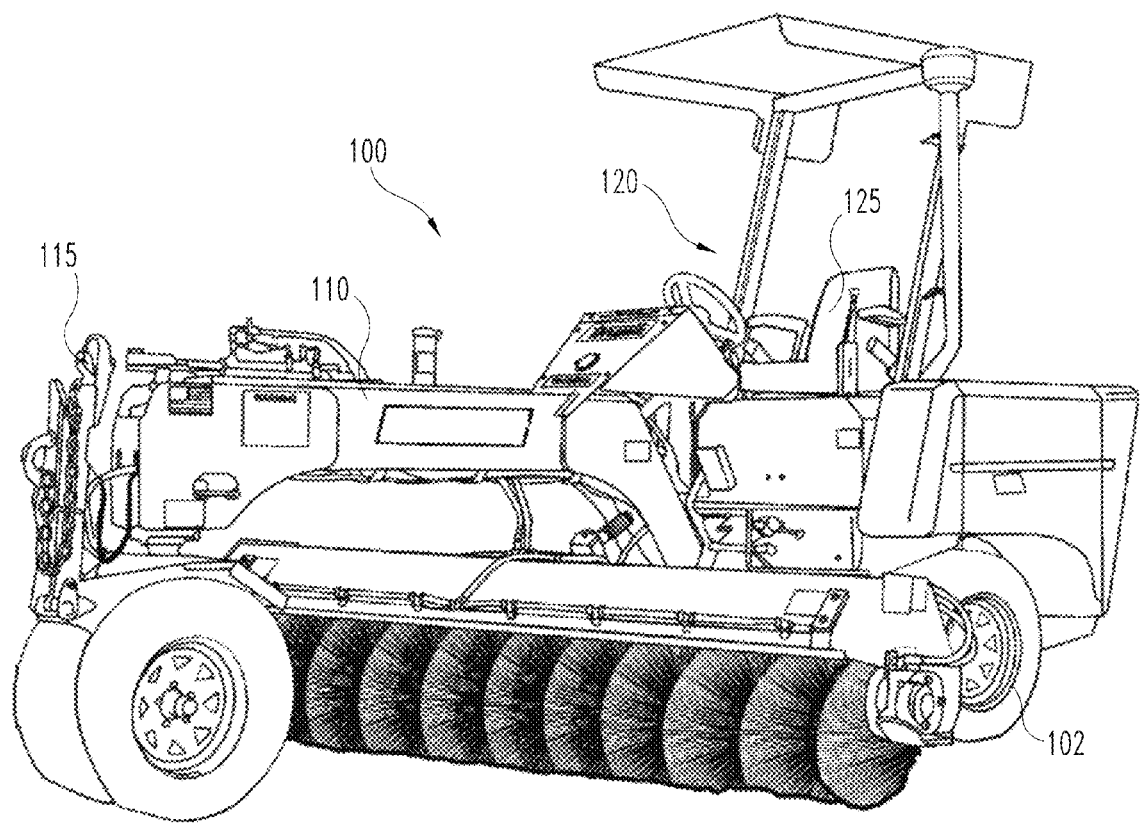
FIG. 3 is a perspective view of an example hydraulic machine usable with embodiments of the present disclosure, namely a self-propelled sweeping machine.

An example of a hydraulic circuit for a towable hydraulic machine according to one embodiment is shown in FIGS. 1 and 2. A non-limiting example of a hydraulic machine 100 such as a model TSS48 Street Sweeper from Terramite, is illustrated in FIG. 3. Typical hydraulic machines usable with embodiments described herein have a frame 110 with one or more hydraulically propelled wheels 102, and may optionally be stand-alone drivable units or may be usable in combination with other movers or machines. The hydraulic machine may include an operator station 120 from which an operator can control the machine. Optionally, the operator station includes a seat 125, so that the operator can ride on the machine. Additional hydraulic circuits may be added to the machine for sweeper or other machine controls, etc., but are not necessary for the present disclosure. Machine 100 may be towed by a towing vehicle using tow hitch 115, via either a pushing or pulling arrangement.

In the illustrated embodiment, the drive system for the two rear wheels 102 on machine 100 includes a hydraulic propelling pump 1 and two hydraulic drive motors 2 and 3. Pump 1 propels hydraulic fluid under pressure into a selected one of supply and return lines 4 and 5 which are connected via the hydraulic circuit to the motors 2 and 3. Motors 2 and 3 are selectively engagable and disengagable to drive corresponding wheels. Pump 1 optionally is a bi-directional operable pump to pump hydraulic fluid into a selected one of lines 4 or 5 which acts as a supply line while the other line acts as a return, yet when desired the flow direction can be reversed to reverse the direction of flow and operation of motors 2 and 3 and the corresponding wheels. In alternate arrangements one or more one-directional or bi-directional pumps may be used to drive, one, two or a plurality of wheels. The hydraulic circuit is preferably a closed circuit which circulates a contained volume of hydraulic fluid, although it may include a charging pump (not shown) operable to add hydraulic fluid to the circuit to replenish fluid lost during operation.

As shown, blocking valves 6 and 7 are arranged in the supply lines 8 and 9 between propelling pump 1 and each of the motors 2 and 3. These blocking valves can optionally be electrically controlled or controlled by hydraulic pilot valves. In the illustrated configuration, pilot pressure is provided from a powered steering system through a pilot line 10 to the hydraulic blocking valves from a secondary pump, such as steering pump 11 located separately on machine 100. The valves are schematically shown in a default, closed configuration in FIG. 1.

The system is in a non-operative configuration when hydraulic fluid flow is blocked within the hydraulic circuit, for example between pump 1 and motors 2 and 3. When the machine is running and the powered steering system is engaged, the blocking valves 6 and 7 are (electronically or via operation of pressure applied through pilot line 10) controllably or automatically changed to an open configuration, allowing hydraulic fluid in line 5 to flow through valves 6 and 7 into or from lines 8 and 9 and thus correspondingly to or from motors 2 and 3. When operation of the machine or the steering system ends, or if steering pressure is lost, the blocking valves 6 and 7, preferably automatically, return to their default, closed configuration and prevent flow between line 5 and lines 8 and 9.

Machine 100 is typically towed with the hydraulic circuit in a non-operative configuration. With the hydraulic flow blocked by blocking valves 6 and 7, any attempt to tow the vehicle without disengaging one or both of the wheels from respective drive motors 2 and 3 will cause the wheels and corresponding drive motors to apply feedback pressure to the hydraulic fluid within the respective one or both of lines 8 and 9 of the hydraulic circuit, creating an improper pressure load in lines 8 or 9. Pressure sensors such as switches 12 and 13 are installed in lines 8 and 9 in communication with fluid flow through motors 2 and 3. For example, the pressure switches are preferably adjacent motors 2 and 3, to sense the pressure in the lines. If pressure switches 12 or 13 sense an improper pressure load in lines 8 or 9 respectively, an alarm is triggered, for example using the electrical circuit of FIG. 2. An improper pressure load can be a load which exceeds a set threshold or which falls below a set threshold.

FIG. 2 is an example electrical circuit showing the electrical alarm circuit portion of the system which can cause an alarm to be triggered by switches 12 or 13. Preferably the system includes an engaged/disengaged switch 14 located adjacent the tow bar/hitch 115 on machine 100 which is engaged by the operator or automatically when the hydraulic machine 100 is placed into an active towing position. In the embodiment shown in FIG. 3, machine 100 is placed into an active towing configuration by lowering a hinged tow bar/hitch 115 located at the front of the machine 100. If the machine is not in an active towing position, the alarm circuit is preferably unpowered and/or disengaged.

In the tow position, switch 14 and the common terminal of relay 16 receive power from a power supply such as battery 15, optionally through an in-line fuse. In its normal condition, the connection of relay 16 to switch 14 is normally closed (NC), allowing switch 14 to draw power through the coil 2 terminal of the relay. Also under normal conditions, the connection terminal of relay 16 to alarm signal elements such as a flasher 18, light 19 and/or horn 20 is in a normally open (NO) arrangement.

Coil 1 terminal of relay 16 is operably connected to switches 12 and 13 via line 17. If an improper pressure load in lines 8 or 9 is sufficient to trigger switches 12 or 13, switches 12 or 13 will switch and will electrically ground line 17, which will cause relay 16 to shift and to begin supplying power from the power supply to the alarm connection terminal, feeding the alarm circuitry to trigger a visual and/or audible alarm for an operator. Preferably, the alarm element is adjacent operator station 120 on machine 100. The operator may then react and fix or override the condition causing the improper pressure load.

Figure 4:
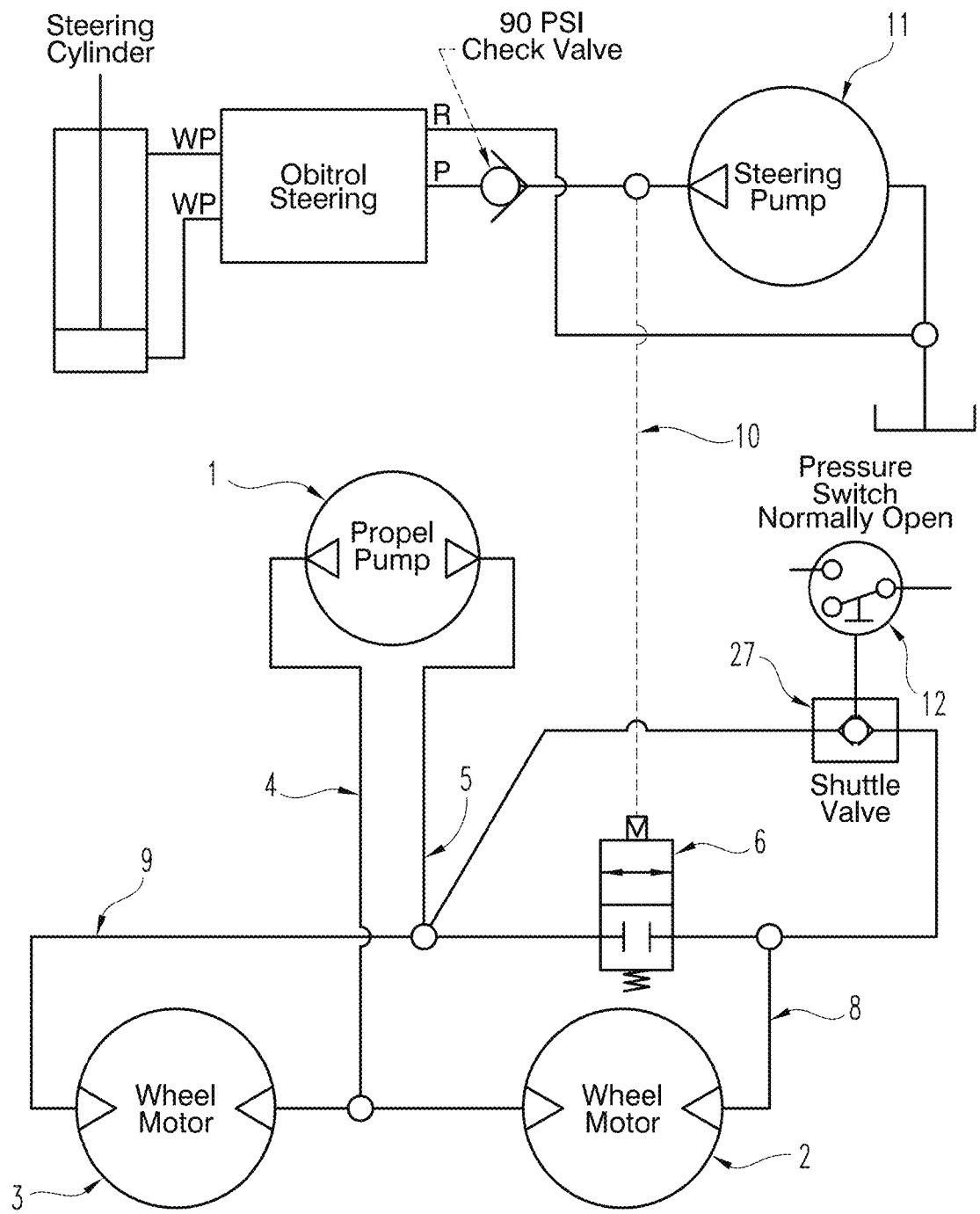
FIG. 4 is a schematic view of a hydraulic circuit according to an alternate preferred embodiment of the present disclosure.
Figure 5:
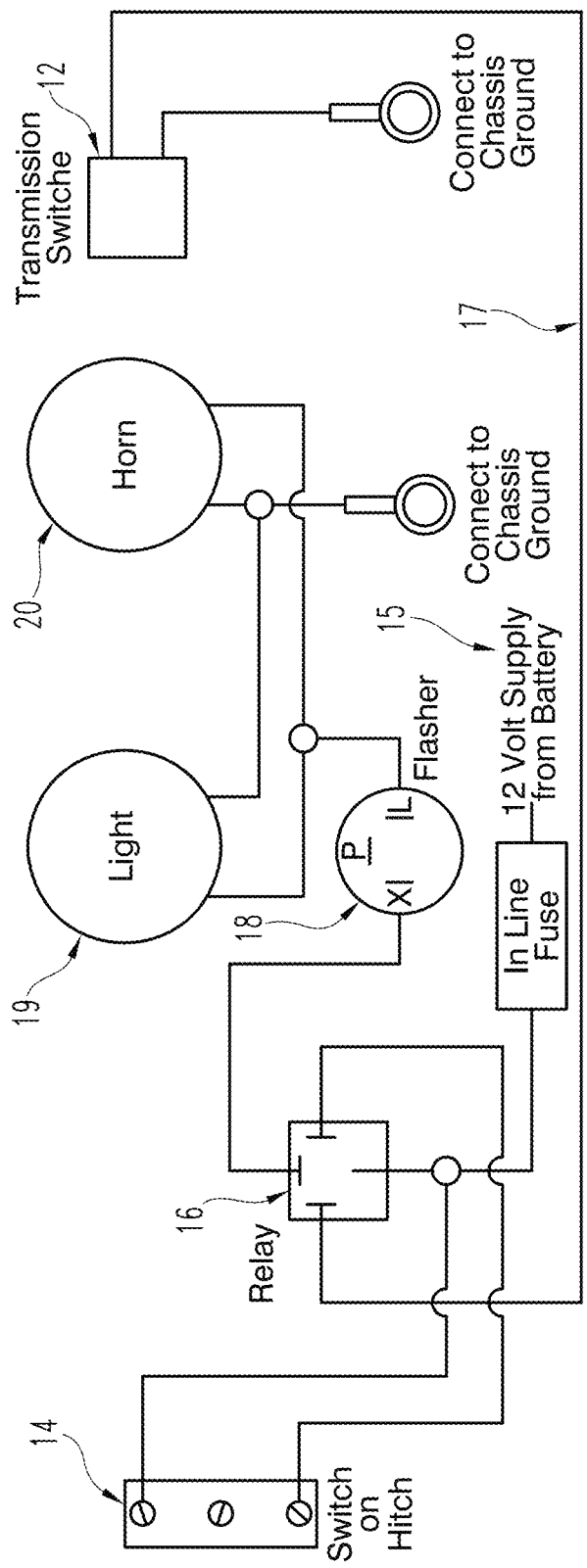
FIG. 5 is a schematic view of an electrical circuit interacting with the hydraulic circuit of FIG. 4.

An example of a hydraulic circuit for a towable hydraulic machine according to an alternate embodiment is shown in FIGS. 4 and 5. The embodiment illustrated in FIGS. 4 and 5 is similar to the embodiment of FIGS. 1 and 2 with the difference that the hydraulic circuit of FIG. 4 uses one blocking valve 6 and accordingly one switch 12 as an alternative to the two valves and switches illustrated in FIGS. 1 and 2. More specifically, FIG. 4 illustrates blocking valve 6 in the hydraulic circuit in communication with fluid flow through wheel motors 2 and 3. Pressure switch 12 is arranged in the hydraulic circuit in parallel to blocking valve 6 and is not arranged in series. When blocking valve 6 is in an operative configuration, hydraulic fluid is allowed to travel through valve 6 either to or from wheel motors 2 and 3. When blocking valve 6 is in a non-operative position, hydraulic fluid flow through valve 6 will be blocked and instead pressure is diverted through parallel lines and applied to shuttle valve 27. If the pressure applied to shuttle valve 27 exceeds or falls below specific thresholds, switch 12 is triggered and correspondingly triggers the electrical alarm circuit illustrated in FIG. 5.

Preferably when blocking valve 6 is in the operative position, shuttle valve 27 restricts or substantially inhibits fluid flow through the shuttle valve so that substantially all of the hydraulic fluid flow occurs through valve 6 without substantial pressure applied to shuttle valve 27. When the system is in a non-operative configuration, shuttle valve 27 also preferably inhibits fluid flow through the valve while allowing applied pressure to trigger pressure sensor 12.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A system comprising:
   a. a towable machine;
   b. at least one hydraulic motor arranged on said machine and operable to drive at least one wheel arranged on said machine;
   c. at least one hydraulic propelling pump arranged to supply hydraulic fluid flow via a hydraulic circuit to said at least one hydraulic motor during operation of said machine to selectively drive said at least one wheel;
   d. said system having a non-operative configuration wherein hydraulic fluid flow is blocked between said at least one hydraulic motor and said at least one propelling pump,
   e. at least one pressure sensor associated with said hydraulic circuit in communication with fluid flow through said at least one hydraulic motor to detect an improper pressure load in said hydraulic circuit when said circuit is in a non-operative configuration and operable to trigger an alarm element; and,
      wherein said alarm element is disengaged when said circuit is in an operating configuration.

2. The system of claim 1 comprising a secondary pump which operates valves to change the hydraulic circuit to an open configuration allowing hydraulic fluid flow from said propelling pump to said at least one hydraulic motor.

3. The system of claim 2, wherein said secondary pump and valves automatically change the hydraulic circuit to an open configuration when said secondary pump is in operation.

4. The system of claim 3, wherein said hydraulic circuit automatically returns to a non-operative configuration when operation of said secondary pump ends.

5. The system of claim 1 comprising at least two hydraulic motors arranged on said machine and operable to drive at least two wheels arranged on said machine.

6. The system of claim 5, wherein hydraulic fluid is supplied via said hydraulic circuit to said at least two hydraulic motors during operation of said machine to selectively drive said at least two wheels.

7. The system of claim 6 wherein said at least one pressure sensor is associated with fluid flow through said first hydraulic motor and comprising a second pressure sensor in communication with fluid flow through said second hydraulic motor to detect an improper pressure load in said hydraulic circuit when said circuit is in a non-operative configuration and operable to trigger an alarm element.

8. The system of claim 7, wherein said alarm element is a visual or audible alarm.

9. The system of claim 8, wherein said alarm element is a flasher, light or horn.

10. The system of claim 1, comprising a switch which engages an electrical circuit including said alarm element when a tow hitch of said machine is placed into a towing configuration.

11. The system of claim 6, wherein said machine includes an operator station from which an operator can control the machine, and wherein said alarm element is adjacent said operator station.

12. The system of claim 11, wherein said operator station includes a seat enabling the operator to ride on the machine.

13. A system comprising:
   a. a hydraulic motor operable to drive a wheel;
   b. a hydraulic circuit arranged to supply hydraulic fluid flow to said hydraulic motor to selectively drive the wheel in an operating configuration, said hydraulic circuit having a non-operative configuration wherein hydraulic fluid is restricted from flowing within said hydraulic circuit;
   c. a pressure sensor associated with said hydraulic circuit in communication with fluid flow through said at least one hydraulic motor to detect an improper hydraulic fluid pressure load in said hydraulic circuit when said circuit is in the non-operative configuration;
   d. an alarm element triggered by said pressure sensor when an improper hydraulic fluid pressure load is detected; and,
   e. a switch which disengages said alarm element when said circuit is in an operating configuration.

14. The system of claim 13 comprising at least two hydraulic motors arranged on said machine and operable to drive at least two wheels arranged on said machine; and wherein hydraulic fluid is supplied via said hydraulic circuit to said at least two hydraulic motors during operation of said machine to drive said at least two wheels.

15. A system comprising:
   a. a hydraulic motor operable to drive a wheel;
   b. at least one hydraulic source arranged to supply hydraulic fluid flow via a hydraulic circuit to said at least one hydraulic motor during operation of said machine to selectively drive said at least one wheel;
   c. said hydraulic circuit having a non-operative configuration wherein hydraulic fluid is restricted from flowing within said hydraulic circuit;
   d. a sensor associated with said hydraulic circuit adjacent said at least one hydraulic motor to detect an improper hydraulic fluid pressure load in said hydraulic circuit when said circuit is in the non-operative configuration; and
   e. an alarm element triggered by said sensor when an improper hydraulic fluid pressure load is detected, wherein said alarm element is disengaged when said circuit is in an operating configuration.

16. The system of claim 15, wherein said hydraulic source is mounted on a frame movable by driving said wheel to propel said system.

17. The system of claim 16, comprising a powered steering system to steer said frame and wherein said hydraulic circuit is automatically changed to an open configuration allowing hydraulic fluid flow from said hydraulic source to said at least one hydraulic motor when power is supplied from said steering system.

18. The system of claim 17, wherein said hydraulic circuit is automatically changed to a non-operative configuration when power from said steering system is disengaged.

19. The system of claim 16, wherein said frame includes an operator station from which an operator can control the system, and wherein said alarm element is adjacent said operator station.

* * * * *